No. 700,412. Patented May 20, 1902.
M. H. FISCHER.
CLUTCH.
(Application filed Sept. 24, 1901.)
(No Model.)

Witnesses:
F. F. Schuyler
Albert F. Mauser

M. H. Fischer, Inventor.
By Wilhelm Bonner
Attorneys.

THE NORRIS PETERS CO., PHOTO-LITHO., WASHINGTON, D. C.

UNITED STATES PATENT OFFICE.

MAX H. FISCHER, OF EAST ORANGE, NEW JERSEY.

CLUTCH.

SPECIFICATION forming part of Letters Patent No. 700,412, dated May 20, 1902.

Application filed September 24, 1901. Serial No. 76,366. (No model.)

*To all whom it may concern:*

Be it known that I, MAX H. FISCHER, a citizen of the United States, residing at East Orange, in the county of Essex and State of New Jersey, have invented new and useful Improvements in Clutches, of which the following is a specification.

This invention relates more particularly to a clutch which is intended to permit the free movement of a rod, bar, or the like lengthwise in one direction relative to the clutch and to prevent the movement of the rod or bar in the opposite direction. The clutch is useful as a means for locking a rod or bar in a socket or surrounding member so as to permit the insertion of the bar into the socket, but prevent the withdrawal of the rod or bar from its socket without releasing the clutch.

The object of the invention is to provide a simple clutch device for the described purpose which will be strong and durable, which will act quickly to positively grip and hold the rod or bar, and which can be easily operated to release the rod or bar.

Figure 1:
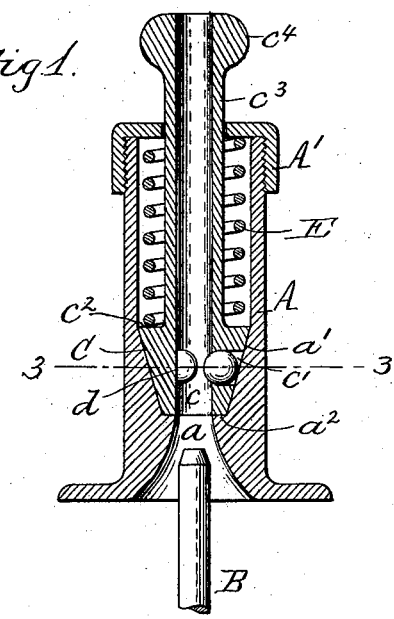
Figure 2:
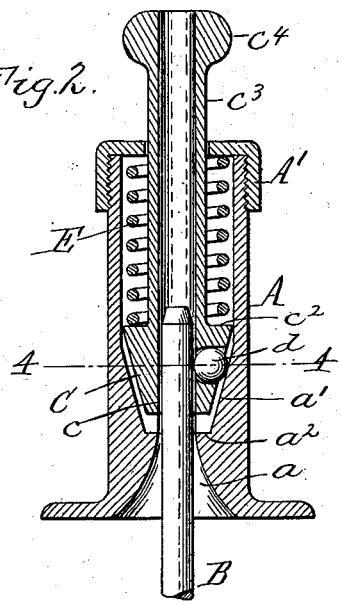
Figure 3:
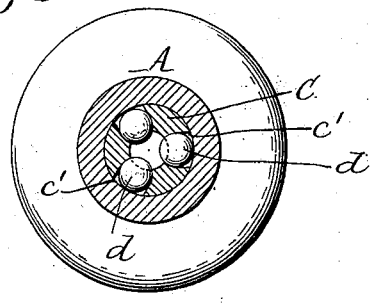
Figure 4:
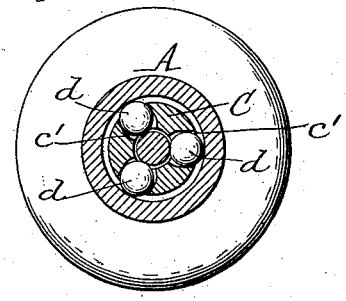
Figure 5:
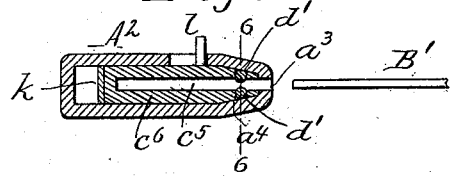
Figure 6:
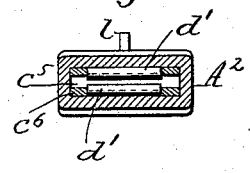
Figure 7:
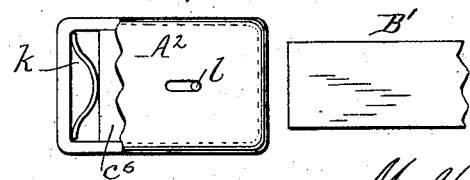

In the accompanying drawings, Figure 1 is a longitudinal sectional view of a clutch, illustrating my invention and showing the normal position of the parts. Fig. 2 is a similar view showing the position of the parts when a rod, bar, or the like is gripped by the clutch. Fig. 3 is a transverse sectional view in line 3 3, Fig. 1. Fig. 4 is a similar view in line 4 4, Fig. 2. Fig. 5 is a longitudinal section of a modified form of the clutch. Fig. 6 is a transverse sectional view in line 6 6, Fig. 5. Fig. 7 is a side elevation of the device shown in Fig. 5.

Like letters of reference refer to like parts in the several figures.

Referring to Figs. 1 to 4 of the drawings, A represents the inclosing casing or holder for the several parts of the clutch. The casing shown in said figures is in the form of a hollow cylinder having centrally arranged in one end a hole $a$, the outer portion of which is preferably enlarged or flared to permit the more ready insertion therein of the rod or bar B. The opposite end of the casing is provided with an external screw-thread for the engagement of a screw-cap $A'$, which is made removable for the purpose of assembling and removing the parts of the clutch. The casing is provided with an internal conical face $a'$, which tapers toward the hole $a$ in the end of the casing and the smallest diameter of which is preferably larger than the diameter of the hole $a$ in order to provide a shoulder or face $a^2$. The conical face is not essential, as one or more inclined faces will serve the purpose. C indicates a spring-pressed carrier, which is provided with a central bore or hole $c$, which is alined with and of substantially the same diameter as the hole $a$ in the end of the casing. The carrier is also provided with lateral holes or pockets $c'$, intersecting the bore $c$ and in which are confined gripping devices $d$, which ride on the conical face $a'$ and are of a size sufficient to protrude from the pockets into the bore $c$ when the spring-pressed carrier forces them toward the small end of the conical face $a'$. Any suitable spring may be employed for moving the carrier forward, a coil-spring E being shown arranged between the screw-cap $A'$ and the inner end $c^2$ of the carrier. The shape of the carrier is immaterial, though that shown, which is frusto-conical, is desirable, inasmuch as the base of the cone slides on the inner wall of the casing and is guided thereby. The number and shape of the gripping devices may be varied, three spheres or balls being preferred in the clutch shown in Figs. 1 to 4, and preferably the inner ends of the pockets $c'$ are smaller in diameter than the largest diameter of the gripping devices in order to prevent the escape of the latter from the pockets into the bore $c$. $c^3$ indicates an operating-stem for the carrier for moving the same away from the conical face $a'$, so as to permit the gripping devices to recede from and release the rod or bar. The stem, as shown, consists of a tubular sleeve extending through a central opening in the screw-cap $A'$ and is provided at its outer end with a knob or head $c^4$. The bore of the stem forms a continuation of the bore $c$ of the carrier and may, if desired, extend entirely through the stem, as shown, so as to permit the use of the clutch on a long rod or bar between its ends.

The operation of the clutch is substantially as follows: Assuming the parts to be in their normal position, (shown in Fig. 1,) with the carrier pressed against the shoulder $a^2$ and the gripping device protruding into the bore $c$ of the carrier, when the end of the rod or bar B is inserted through the opening $a$ into the carrier its passage will be obstructed by the protruding gripping devices. By pushing on the rod the gripping devices and carrier are moved against the action of the spring E, and the gripping devices are permitted to recede into the pockets, into which they are forced by the rod or bar B, which is then permitted to slide past the gripping devices. When it is attempted to move the rod or bar in the opposite direction, the gripping devices, which are held in engagement with the sides of the rod by the spring-pressed carrier tending to move them on the conical face $a'$, will by reason of their frictional contact with the rod be drawn along the conical face $a'$, toward the small end thereof, and will wedge tightly between the rod or bar and the conical face $a'$, thus effectually holding the rod or bar against movement in that direction.

The construction of the device shown in Figs. 5 to 7 shows the clutch slightly modified and more especially adapted for use in connection with a flat or thin bar or strip. In said Figs. 5 to 7 the casing $A^2$ is rectangular in cross-section and is provided with a narrow opening $a^3$ in one end, through which the bar or strip B' is adapted to be inserted into the opening $c^5$ in the carrier $c^6$, which is provided with elongated rollers $d'$ confined in pockets in the carrier and working against inclined faces $a^4$ on the casing. $k$ indicates a flat spring located between the rear end of the casing and the rear end of the carrier for holding the carrier forward in its normal position. $l$ indicates the operating-stem, which is shown to project from one side of the carrier out through a slot in one side of the casing. The operation of the clutch shown in Figs. 5 to 7 is substantially the same as that of the device shown in Figs. 1 to 4.

I claim as my invention—

1. The combination with a stationary member, of a carrier movable longitudinally relative to said stationary member, a gripping device carried by said carrier and movable transversely of the line of movement of the carrier, and a part on said stationary member for moving said gripping device transversely, substantially as set forth.

2. The combination with a casing having an inclined face, of a carrier in said casing, a spring for moving the same in one direction, an operating device for moving the same against the action of said spring, and a gripping device carried by said carrier and moved by said inclined face transversely of the line of movement of said carrier, substantially as set forth.

3. The combination with a casing having a hole in one end and an inclined face, of a spring-pressed carrier in said casing having a bore or hole in alinement with the hole in the end of the casing, and pockets intersecting with said bore, gripping devices confined in said pockets and working on said inclined face, and an operating part for said carrier, substantially as set forth.

4. The combination with a casing having a hole in one end and a conical internal face, of a carrier in said casing having a bore or hole in alinement with the hole in the end of the casing and pockets intersecting with said bore, an operating-stem for said carrier projecting through an opening in the opposite end of the casing and having a hole alined with the bore in the carrier, and a coil-spring surrounding said stem and confined between the carrier and the end of the casing, substantially as set forth.

Witness my hand this 17th day of August, 1901.

MAX H. FISCHER.

Witnesses:
C. B. HORNBECK,
JNO. J. BONNER.